Patented Dec. 11, 1923.

1,477,096

UNITED STATES PATENT OFFICE.

WALTER B. ALLEN, OF WORCESTER, MASSACHUSETTS, ASSIGNOR TO ALINALL MANUFACTURING COMPANY, OF WORCESTER, MASSACHUSETTS, A CORPORATION OF MASSACHUSETTS.

INTERIOR-WALL FINISH.

No Drawing. Application filed February 2, 1922. Serial No. 533,667. REISSUED

*To all whom it may concern:*

Be it known that I, WALTER B. ALLEN, a citizen of the United States, residing at Worcester, in the county of Worcester and State of Massachusetts, have invented new and useful Improvements in Interior-Wall Finish, of which the following is a specification.

The object of my invention is the production of a paint to be applied to interior walls of buildings for the purpose of providing an economical coating and finish.

My composition consists essentially of a mixture of casein, a proportionally small quantity of an alkaline substance such as borax or ammonia, and a large quantity of a neutral mineral filler such as powdered mica, clay or other silicious materials.

In preparing the composition I prefer to use the ingredients in about the following proportions, namely, eighteen pounds of casein, three pounds of borax or ammonia, five pounds of hydrated lime, forty-five pounds of powdered mica—180-200 mesh, thirty-five pounds of china clay and seven pounds of oxide of zinc. Good results may be obtained, however, when the ingredients are varied somewhat in proportions or when only the casein, borax and powdered mica are used, the proportions then being eighteen pounds of casein, three pounds of borax and sixty pounds of powdered mica or other neutral mineral filler.

These ingredients are mixed with any desired coloring matter and a quantity of warm water sufficient to form a fluid of slightly greater consistency than ordinary house paint. It may be applied in one or more coats, but one coat of my composition is generally sufficient to accomplish the desired result.

My composition is equally adapted for a finish over wall paper or plastered surfaces in either new or repair work, and it can usually be applied without any preparation of the surface to which it is to be applied, and can be used in a single coat. thereby producing a finish equal or superior in quality to ordinary paint, more convenient to use and at less expense.

What I claim and desire to secure by Letters Patent is:

A composition for interior wall finish, comprising eighteen pounds of casein, three pounds of alkali, five pounds of hydrated lime, forty-five pounds of powdered mica—180-200 mesh, thirty-five pounds of china clay, and seven pounds of oxide of zinc.

In testimony whereof I have hereunto set my hand in presence of two subscribing witnesses, this 31st day of January, 1922.

WALTER B. ALLEN.

Witnesses:
ALICE G. SULLIVAN,
K. M. SULLIVAN.